United States Patent [19]

Hamilton et al.

[11] Patent Number: 5,737,607
[45] Date of Patent: Apr. 7, 1998

[54] METHOD AND APPARATUS FOR ALLOWING GENERIC STUBS TO MARSHAL AND UNMARSHAL DATA IN OBJECT REFERENCE SPECIFIC DATA FORMATS

[75] Inventors: Graham Hamilton, Palo Alto; Swee Boon Lim, Mountain View; Peter B. Kessler, Palo Alto; Jeffrey D. Nisewanger, San Jose; Sanjay R. Radia, Fremont, all of Calif.

[73] Assignee: Sun Microsystems, Inc., Palo Alto, Calif.

[21] Appl. No.: 534,966

[22] Filed: Sep. 28, 1995

[51] Int. Cl.⁶ ............................................. G06F 15/16
[52] U.S. Cl. ............................................. 395/701; 395/705
[58] Field of Search .................................. 395/500, 701, 395/712, 614, 615, 670, 705

[56] References Cited

U.S. PATENT DOCUMENTS

| | | | |
|---|---|---|---|
| 5,280,610 | 1/1994 | Travis, Jr. et al. | 395/614 |
| 5,327,529 | 7/1994 | Fults et al. | 395/335 |
| 5,377,350 | 12/1994 | Skinner | 395/683 |
| 5,404,523 | 4/1995 | Della Fera et al. | 395/671 |
| 5,511,197 | 4/1996 | Hill et al. | 395/683 |
| 5,511,199 | 4/1996 | Anthias et al. | 395/683 |
| 5,526,491 | 6/1996 | Wei | 395/200.09 |
| 5,539,909 | 7/1996 | Tanaka et al. | 395/683 |
| 5,548,723 | 8/1996 | Pettus | 395/200.01 |

FOREIGN PATENT DOCUMENTS

| | | |
|---|---|---|
| A0501610 | 9/1992 | European Pat. Off. . |
| A0604010 | 6/1994 | European Pat. Off. . |
| A0643349 | 3/1995 | European Pat. Off. . |

OTHER PUBLICATIONS

OS/2 Developer, vol. 6, No. 5, Sep./Oct. 1994 pp. 46–53 XP002022570, Robert Orfail & Dan Harkey: "Client/Server Programming with CORBA Objects".

"The Java Language Specification", Release 1.0 Alph3, May 11, 1995, Sun Microsystem Computer Corporation.

"Java and Internet Programming", Dr. Dobb's Journal, Aug. 1995, pp. 56–61 and 101–102.

The Coming Software Shift Telecom:, by George Gilder, Aug. 28, 1995, pp. 147–162.

"The Internet becomes multimedia–savvy: Macromedia, Sun nabe Netscape Navigator", by Jason Snell, MacUser, Sep. 1995, vol. 11, No. 9, p. 31(1).

"OSF Opens Software Web Mall For Java", Newsbytes, Jul. 26, 1995.

(List continued on next page.)

*Primary Examiner*—Parshotam S. Lall
*Assistant Examiner*—Viet Vu
*Attorney, Agent, or Firm*—Erwin J. Basinski; Hickman Beyer & Weaver

[57] ABSTRACT

The invention provides solutions to the problems which are encountered by object oriented systems designers when attempting to implement schemes for object invocation and for argument passing in distributed systems wherein the arguments may be objects, and wherein the system supports a multiplicity of ORB-specific data formats, in ways which do not lock the object oriented base system into methods which may be difficult to change at a later time. Moreover, the invention disclosed describes a "Marshal Buffer mechanism" which contains methods for marshaling data for a specific ORB; a "Multi-ORB Marshaling system" which permits a Client Application and related stub to invoke an operation on a target object without any knowledge or concern about which ORB this target object uses or what data format the ORB requires for the arguments of the operation invoked; and a "Computer system for multi-ORB communication" comprising an ORB independent layer which contains Client Applications and stubs; an ORB dependent-OS independent layer which contains ORB dependent code/Subcontract code mechanisms as well as ORB specific Marshal Buffers for a multiplicity of ORBs; and an Operating System (OS) layer.

21 Claims, 7 Drawing Sheets

OTHER PUBLICATIONS

"Complex Browsers Seek to Expand Role", (World Wide Web browsers), by Scott R. Raynovich, LAN Times, Jul. 3, 1995, vol. 12, No. 13, p. 1(2).

"Sun, Netscape to wake up Web users", (Sun Microsystems license its Java World Wide Web development Language to Netscape Communications Corp), Scott R. Raynovich, LAN Times, Jun. 19, 1995, vol. 12, No. 12, p. 44(1).

"Internet access: Sun unveils most complete set of Internet business solutions available today; Internet pioneer delivers on challenge of electronic commerce", EDGE: Work-Group Computing Report, May 29, 1995, vol. 6, No. 262.

"Sun takes new shape" (Sun Microsystems strategy for its UltraSPARC microprocessor), by Jim DeTar, Electronic News (1991), May 29, vol. 41 No. 2067, p. 1 (2).

"HotJava could become a lot hotter than just a Web browser for animations" (Sun Microsystems HotJava Web browser) (Distributed Thinking), by Stewart Alsop, InfoWorld, May 29, 1995, vol. 17, No. 22, p. 94(1).

"Sun Microsystems Bringing Interactive Technology to the WWW", by Michael Goulde, Open Information Systems, Mar. 1995, vol. 10, No. 3, p. 29(3).

"Hi-resolution" (New Year's resolutions), by Gil Schwartz, PC-Computing, Jan. 1995, vol. 8, No. 1, p. 77(1).

"The Common Object Request Broker: Architecture and Specification", (COBRA V2.0) Revision 2.0, Jul. 1995.

"A Spring Collection", (A Collection of Papers on the Spring Distributed Object-Oriented Operating System), SunSoft, Sep. 1994.

```
//
// MarshalBuffer describes a set of arguments or results to or from
// an IDL call.
// package OP;

public interface MarshalBuffer  {
    byte getByte() throws CORBA.SystemException;
    byte [] getBytes (int len) throws CORBA.SystemException;
    short getShort() throws CORBA.SystemException;
    int getInt() throws CORBA.SystemException;
    long getLong() throws CORBA.SystemException;
    char getChar() throws CORBA.SystemException;
    char [] getChars (int len) throws CORBA.SystemException;
    boolean getBool() throws CORBA.SystemException;
    String getString() throws CORBA.SystemException;
    float getFloat() throws CORBA.SystemException;
    double getDouble() throws CORBA.SystemException;
    public OP.SequenceHeader getSequencePreamble() throws CORBA.SystemException;

void putByte(byte x) throws CORBA.SystemException;
    void putBytes(byte x[]) throws CORBA.SystemException;
    void putShort(short x) throws CORBA.SystemException;
    void putInt(int x) throws CORBA.SystemException;
    void putLong(long x) throws CORBA.SystemException;
    void putChar(char x) throws CORBA.SystemException;
    void putChars(char x[]) throws CORBA.SystemException;
    void putString(String x) throws CORBA.SystemException;
    void putBool(boolean x) throws CORBA.SystemException;
    void putFloat(float x) throws CORBA.SystemException;
    void putDouble(double x) throws CORBA.SystemException;
    public void putSequencePreamble(int length) throws CORBA.SystemException;

void putNull() throws CORBA.SystemException;
    void unmarshal_object (CORBA.CORBA_Object.ObjRef ref) throws CORBA.SystemException;

// Release means that the MarshalBuffer can discard or recycle its contents.
    void release();

// reset means that the marshal buffer should be put back into the same
    // state as a newly constructed MarshalBuffer
    void reset() throws CORBA.SystemException;
}
```

METHOD AND APPARATUS FOR ALLOWING GENERIC STUBS TO MARSHAL AND UNMARSHAL DATA IN OBJECT REFERENCE SPECIFIC DATA FORMATS

BACKGROUND OF THE INVENTION

1. Field of the Invention

The present invention relates to the fields of distributed computing systems, client-server computing and object oriented programming. Specifically, the present invention is a method and apparatus for providing program mechanisms which allow generic stubs to marshal and unmarshal data in object-reference-specific data formats.

BACKGROUND

A key problem in modern object oriented distributed processing systems is permitting object applications to communicate with a new object request broker ("ORB") which has its own unique data format, with only minor modification to the supporting code mechanisms. Similarly client applications and stubs should be able to communicate seamlessly with different ORBs in a system which can communicate with a multiplicity of ORBs wherein each of the ORBs has its own unique data format.

For example, the Object Management Group (OMG) is an industry standards organization that is creating multi-vendor standards for distributed object-oriented programming. One of the cornerstones of the OMG work has been the definition of a common Interface Definition Language, known as IDL, that is now in widespread use as a standard way for defining interfaces to network objects in a way that is independent of the particular network protocols that are being used or the particular programming languages that are being used by the clients and the servers.

The IDL language is object-oriented and supports multiple inheritance. It comes with a rich set of built-in primitive types (such as floats, booleans, etc.) and also defines a set of structured types including structs, unions and sequences.

The Object Management Group standardized on the IDL interface definition language as a uniform way of defining interfaces to network objects. However, the OMG initially left the on-the-wire protocol and data formats undefined. As a result different vendors implemented ORBs with different protocols and different data formats.

Recently the OMG has agreed on a common ORB interoperability protocol, the Universal Networked Objects (UNO) protocol. However this is primarily viewed as a gateway protocol for connecting object systems from different vendors. At least in the short term different vendors appear likely to continue to use their existing protocols for higher performance within their own object systems, while supporting lower performance UNO gateways to other ORBs. Thus a current need exists to permit object applications to transparently communicate with these ORBs with different protocols and different data formats.

For further description of object oriented design and programming techniques see "Object-oriented Software Construction" by Bertrand Meyer, Prentice-Hall 1988. For further information on OMG, CORBA, ORBs and IDL see the "Common Object Request Broker: Architecture and Specification", Revision 2.0, July 1955 which is hereby fully incorporated herein by reference.

Currently Internet browsers are very limited in their ability to interact with network servers. Typically a browser such as Mosaic will down-line load an HTML document and then wait passively for a human user to either select another document or to enter HTML forms information that can be passed back to the server.

Two new developments are promising to make the Internet a more dynamic environment. The first is support for scripting languages in Internet browsers (such as the Sun Microsystems, Inc. (SUN) JAVA language described below) so that a browser can download and execute interactive scripts. This transforms browsers from being passive viewers into being dynamic agents that can interact with the Internet on a user's behalf and display rapidly changing information. The second development is the widespread adoption of the Object Management Group's distributed object interfaces based on the IDL interface definition language. These provide a standard way for network servers to export services as "network objects" in a language and vendor independent way. This will make it much easier to build network services that can be transparently accessed from different client environments.

Java

Java is a strongly typed object-oriented language with a C like syntax. The Java compiler and run-time code mechanisms enforce type safety so that there can be no wild pointers or other references that violate the language's type system. So for example, there is no "void *" and all casts are validated at runtime.

The Java language is typically compiled to machine-independent byte-codes and then a Java virtual machine interprets those byte codes in order to execute the Java program. Java can be integrated into network HTML browsers, so that as part of viewing a document one can down-line load a set of Java byte-codes and then execute them on the client machine. Because Java is completely typesafe the client browser can feel confident that the Java program can be executed safely without endangering the security or integrity of the client. Java is more fully described in "The Java Language Specification" release 1.0 Alpha3, by Sun Microsystems, Inc. dated May 11, 1995 which is hereby fully incorporated herein by reference.

Scripted language systems like Java generate Java programs that are designed to be portable and to be deployed in a variety of different environments. It is therefore desired to allow Java programs to use different ORBs without requiring any changes to the Java program. Because the generated stubs are part of the Java program it is necessary that the stubs be ORB-independent so that the Java program and its associated stubs might be used in any of a multiplicity of ORBs.

This disclosure describes a solution to the basic problem by creating a generic interface between the stubs and ORB specific data mechanisms. These ORB specific data mechanisms include one or more Marshal Buffer Objects which have methods for marshaling and unmarshalling one or more particular ORB related on-the-wire data formats and a method and apparatus for using an object reference (Objref) to indicate the particular Marshal Buffer Object to use for this particular Object call.

SUMMARY OF THE INVENTION

The present invention provides an elegant and simple way to provide mechanisms for invocation of objects by client applications and for argument passing between client applications and object implementations, without the client application or the operating system knowing the details of how these mechanisms work. Moreover, these mechanisms functions in a distributed computer environment with similar ease and efficiency, where client applications may be on one computer node and object implementations on another.

In one aspect of the invention, a "Computer system for multi-ORB communication" is disclosed which includes an Object Request Broker (ORB) independent layer which contains Client Applications and stubs; an ORB dependent-OS independent layer which contains ORB dependent code/Subcontract code mechanisms as well as ORB specific Marshal Buffers for a multiplicity of ORBs; and an Operating System (OS) layer.

In another aspect, a "Multi-ORB Marshaling system" is disclosed which permits a Client Application and related stub to invoke an operation on a target object without any knowledge or concern about which ORB this target object uses or what data format the ORB requires for the arguments of the operation invoked.

In yet another aspect, the invention disclosed describes a "Marshal Buffer mechanism" which contains methods for marshaling data for a specific ORB.

In another aspect of the invention, a computer performed method of processing calls from a client application to an ORB requiring a specific data format is disclosed wherein the client application and its related stub are not required to know which ORB is being used or which format is required for the data. The method includes a process for finding a MarshalBuffer which can provide the correct data format marshaling for the correct ORB.

Similarly, the claimed invention includes a computer program product embodying these inventive mechanisms.

DESCRIPTION OF THE DRAWINGS

The objects, features and advantages of the system of the present invention will be apparent from the following description in which:

FIG. 6 illustrates an exemplary MarshalBuffer code Mechanism.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes solutions to the problems which are encountered by object oriented systems designers when attempting to implement schemes for object invocation and for argument passing in distributed systems wherein the arguments may be objects, in ways which do not lock the object oriented base system into methods which may be difficult to change at a later time. Moreover, the invention disclosed describes a "Marshal Buffer mechanism" which contains operations (called "methods" in Object Oriented programming parlance) for marshaling data for a specific ORB; a "Multi-ORB Marshaling system" which permits a Client Application and related stub to invoke an operation on a target object without any knowledge or concern about which ORB this target object uses or what data format the ORB requires for the arguments of the operation invoked; and a "Computer system for multi-ORB communication" comprising an ORB independent layer which contains Client Applications and stubs; an ORB dependent-OS independent layer which contains ORB dependent code/Subcontract code mechanisms as well as ORB specific Marshal Buffers for a multiplicity of ORBs; and an Operating System (OS) layer. The "ORB dependent code mechanism" used in the present invention, is analogous to the "subcontract mechanism" which is associated with each object and which is described in co-pending patent application Ser. No. 07/995,863 filed Dec. 21, 1992 which is incorporated fully herein by reference.

In the following description, for purposes of explanation, specific data and configurations are set forth in order to provide a thorough understanding of the present invention. The preferred embodiment described herein is implemented as a portion of the SPRING-DISTRIBUTION Object-Oriented Operating System created by Sun Microsystems®, Inc. (Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems. The Spring-Distribution Object-Oriented Operating System is described in "A Spring Collection" A collection of Papers on the Spring distributed Object-Oriented Operating System published September 1994 by sun Microsystems, Inc. which is hereby fully incorporated herein by reference.

ADDITIONAL BACKGROUND INFORMATION

Operating Environment

Figure 1:
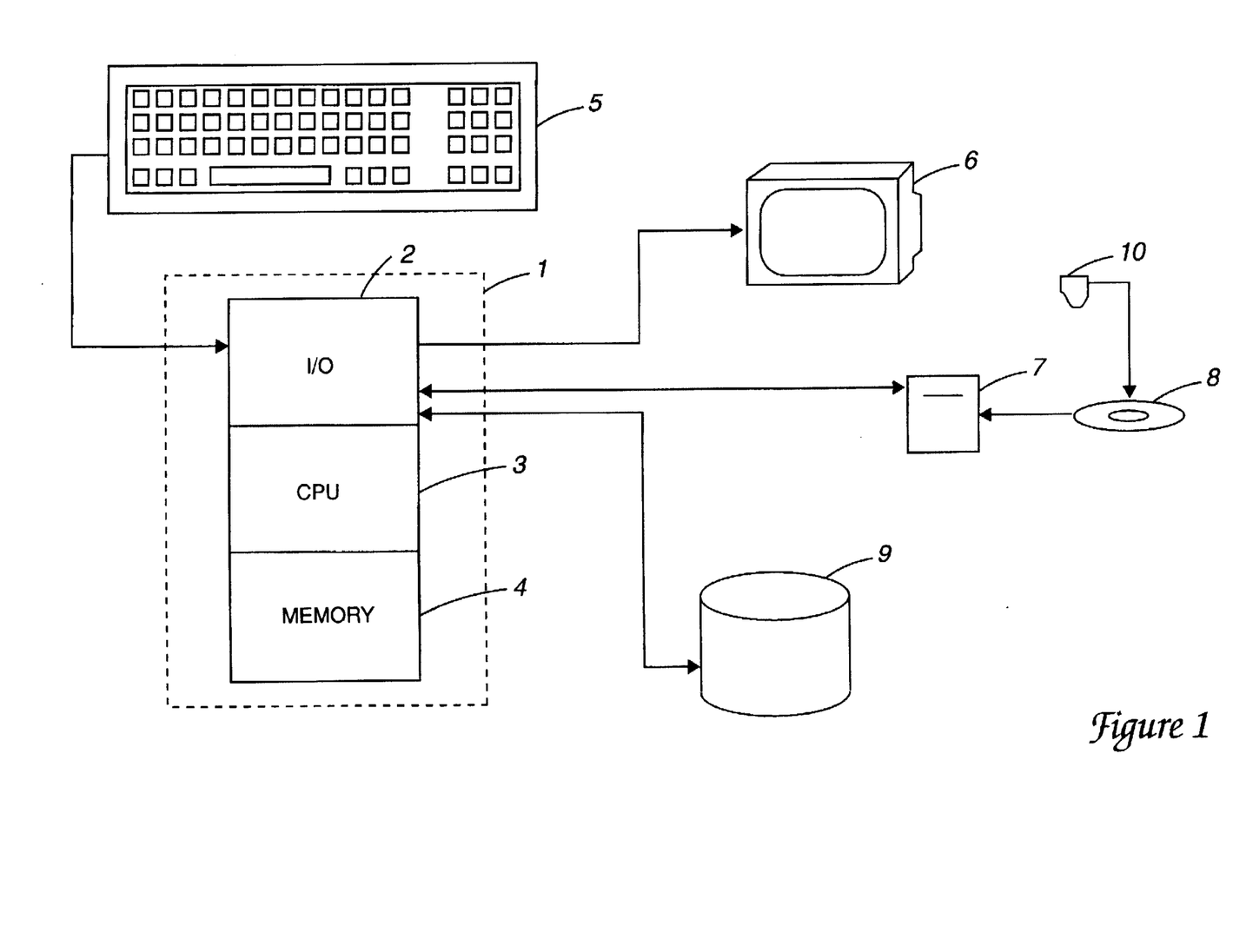
FIG. 1 illustrates the configuration of a typical computer hardware system used with and as a part of the present invention.

The environment in which the present invention is used encompasses the general distributed computing system, wherein general purpose computers, workstations, or personal computers are connected via communication links of various types, in a client-server arrangement, wherein programs and data, many in the form of objects, are made available by various members of the system for execution and access by other members of the system. Some of the elements of a general purpose workstation computer are shown in FIG. 1, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains program code mechanisms 10 and data.

Stubs

Figure 2:
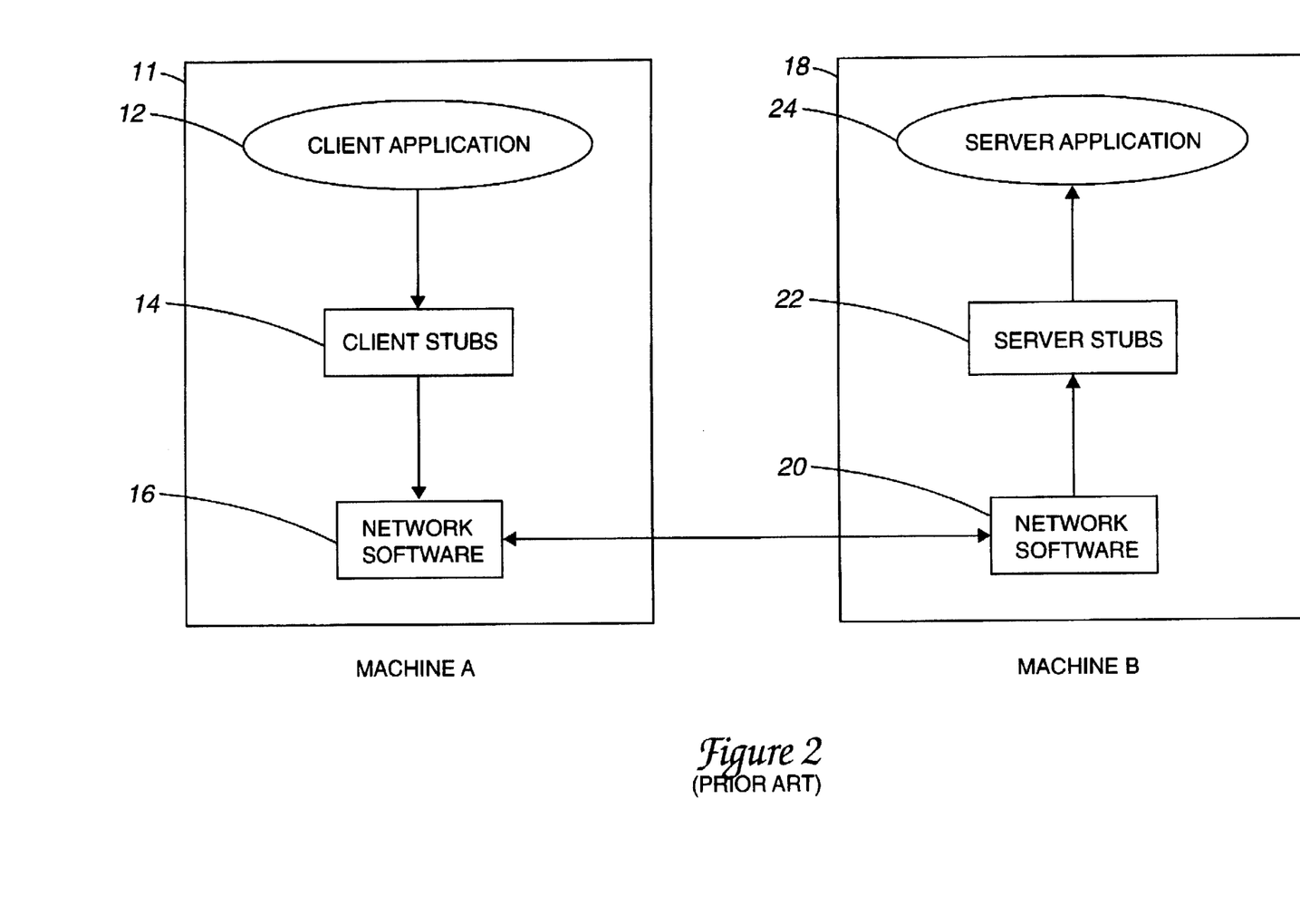
FIG. 2 illustrates the prior art relationship of client and server applications to stubs and network software.

Techniques for providing a language-level veneer for remote operations (for example, "Remote Procedure Calls") have been in use for many years. Typically these take the form that a remote interface is defined in some language. Then a pair of stubs are generated from this interface. The client stub runs in one machine and presents a language level interface that is derived from the remote interface. The server stub runs in some other machine and invokes a language-level interface that is derived from the remote interface. Referring now to FIG. 2, to perform a remote operation, a client application 12 on one machine 11, invokes the client stub 14, which marshals the arguments associated with the invocation into network buffer(s) and transmits them to the server stub 22 on the remote machine 18, which unmarshals the arguments from the network buffer(s) and calls the server application 24. Similarly, when the server application 24 returns a response, the results are marshaled up by the server stub 22 and returned to the client stub 14, which unmarshals the results and returns them to the client application 12. The entire mechanics of argument and result transmission, and of remote object invocation, are performed in the stubs. Both the client application and the server application merely deal in terms of conventional language-level interfaces.

When the arguments or results are simple values such as integers or strings, the business of marshaling and unmarshalling is reasonably straightforward. The stubs will normally simply put the literal value of the argument into the network buffer. However, in languages that support either abstract data types or objects, marshalling becomes significantly more complex. One solution is for stubs to marshall the internal data structures of the object and then to marshal this data back into a new object. This has several serious deficiencies. First, it is a violation of the "abstraction" principle of object-oriented programming, since stubs have no business knowing about the internals of objects. Second, it requires that the server and the client implementations of the object use the same internal layout for their data structures. Third, it may involve marshalling large amounts of unnecessary data since not all of the internal state of the object may really need to be transmitted to the other machine. An alternative solution is that when an object is marshalled, none of its internal state is transmitted. Instead an identifying token is generated for the object and this token is transmitted. For example in the Eden system, objects are assigned names and when an object is marshalled then its name rather than its actual representation is marshalled. Subsequently when remote machines wish to operate on this object, they must use the name to locate the original site of the object and transmit their invocations to that site. This mechanism is appropriate for heavyweight objects, such as files or databases, but it is often inappropriate for lightweight abstractions, such as an object representing a cartesian coordinate pair, where it would have been better to marshal the real state of the object. Finally, some object-oriented programming systems provide the means for an object implementation to control how its arguments are marshalled and unmarshalled. For example, in the Argus system object implementors can provide functions to map between their internal representation and a specific, concrete, external representation. The Argus stubs will invoke the appropriate mapping functions when marshalling and unmarshaling objects so that it is the external representation rather than any particular internal representation that is transmitted. These different solutions all either impose a single standard marshalling policy for all objects, or require that individual object implementors take responsibility for the details of marshalling. An advanced object marshaling process is described in the above referenced co-pending patent application Ser No. 07/995,863 filed Dec. 21, 1992 which describes "Subcontracts."

Current Problem Summary

Specific Problem for Current Object Oriented Systems

The specific problem here is that different ORBs have different on-the-wire data formats. So one ORB might marshal bytes in little-endian order, another in big-endian, etc. Different ORBs also have different on-the-wire formats for arrays, strings, unions, etc.

So it is desirable to have ORB independent stubs that can marshal their data differently when talking to different objects. Thus, one might use a DEC data format when talking to a DEC object and a Sun data format when talking to a Sun object. And it is desirable for one to allow a single set of stubs to be in simultaneous use with different ORBs.

Proposed Solution to the Problem

The solution is;

(1) define a generic interface for marshalling. This generic interface provides methods for marshalling and marshalling ints, shorts, bytes, chars, and strings. But it says nothing about how these methods are implemented.

(2) Different ORBs provide their own implementation of the generic marshal buffer interface. As well as supporting the generic marshalling and unmarshalling methods, these ORB specific marshal classes may provide additional methods for marshaling ORB specific data. For example the Spring ORB implementation of MarshalBuffer provides methods for marshalling and unmarshalling Spring doors.

(3) Each object reference (Objref) contains a pointer to a set of ORB runtime machinery that belongs to the ORB that implements that object. In the preferred implementation this consists of a pointer to the client side ORB-dependent code mechanism/subcontract for the object.

(4) The ORB runtime machinery described in (3) will support a method for obtaining a MarshalBuffer object. The runtime machinery will return a MarshalBuffer object that implements the correct marshalling and unmarshalling for that ORB.

(5) The generic stubs work entirely in terms of the generic MarshalBuffer interface.

(6) At the beginning of each call, the generic stubs call into the ORB specific runtime code mechanisms associated with the object reference to get an appropriate MarshalBuffer object. The stubs then use the generic marshaling and unmarshalling interfaces to marshal and unmarshal data to and from that MarshalBuffer object. Since the implementations of these marshal and unmarshal methods are ORB specific, this means that the data is being marshalled and unmarshalled in an ORB specific way.

In the currently preferred embodiment, the generic MarshalBuffer includes additional capabilities for handling differences in several known ORBs. For example, (a) in addition to methods for marshalling and unmarshalling simple data types, the generic MarshalBuffer provides a way for Marshalling array descriptors. This method takes the bounds of the array and then marshals an array descriptor in an ORB specific way. For example, the DOE ORB code marshals the length of the array. But the Spring ORB code marshals the lower bound and the upper bound, and (b) similarly provides mechanisms for unmarshalling an array descriptor.

HOW TO MAKE AND USE THE INVENTION

A Portable ORB Implementation

One of the goals for the preferred embodiment of the present invention is for the Java ORB implementation to be allowed to work directly with a variety of different on-the-wire protocols and data formats. In particular, a single Java program must be able to simultaneously use object references that refer to objects in different ORBs. The internet is a very heterogeneous environment and it is desired not to restrict Java IDL clients to only working with a single server at a time.

In particular the Java ORB implementation of the preferred embodiment must be able to communicate directly with both Sun's Distributed Object Environment (DOE) and with the Spring distributed operating system. It is also desired to design the Java ORB core so that it could communicate with UNO gateways or with DCE based object systems.

Portability Issues

Portability is an issue at several different levels.

At the lowest level, Java's socket class is used to get machine and OS independent access to the IP protocol family.

At the next level up, different ORBs use different low-level network transport protocols. For example, Sun's DOE systems uses ONC RPC, the Spring system uses an optimized sequenced packet protocol, UNO uses TCP/IP, some other vendors use DCE RPC, etc. However, while this may seem like fairly major difference it is actually comparatively easy to plug in different low level transport protocols.

Unfortunately, the different transport protocols also come with different data formats for simple data types. For example, integer values may have to be transmitted in big-endian byte order for an ONC ORB and in little-endian byte order for a DCE ORB. This affects the way that one can marshal and unmarshal arguments from the marshal buffers.

At the next level up, even if two ORBs agree on a standard format for simple data types, they may disagree on how to handle the IDL structured data types. For example both the Spring ORB and the DOE ORB use the ONC XDR format for simple data types, but when they transmit an array descriptor the DOE ORB simply transmits an integer specifying the length, whereas the Spring ORB transmits two integers, one specifying the array's lower bound and the other specifying the array's upper bound. This means that if one wants to have stubs that can be used between different ORBs then the stubs can't directly marshal things like array descriptors, but instead must call into some ORB specific code.

Finally there are likely to be different formats for the various kinds of IDL related meta-data, such as object references, method identifiers, exception identifiers, and type identifiers. For example, Spring uses integers as method identifiers. Other ORBs send either a simple method name or a fully qualified interface name plus method name combination.

The Portability Strategy

In the preferred embodiment, the general strategy has been to create stubs that are ORB independent and to conceal the ORB dependencies inside the individual object references. This has the major advantage that a single Java stub compiler can be used that can generate stubs that can be used with any ORB. However this means that there must be interfaces between the stubs and the object reference that allow the stubs to marshal arguments and invoke remote operations in an ORB independent manner.

Experience with using the subcontract mechanism in the Spring system was used in designing the separation between the stubs and the ORB specific layer. Spring permits different object references to have different formats and to have different invocation mechanisms, so as to be able to support things like replication and data caching. It does this by associating a software module called a subcontract with each object reference. When the Spring stubs want to marshal or invoke an object reference, they call into the subcontract associated with the object reference, so that the marshalling or object invocation is performed in a way that is appropriate to that subcontract.

Figure 3:
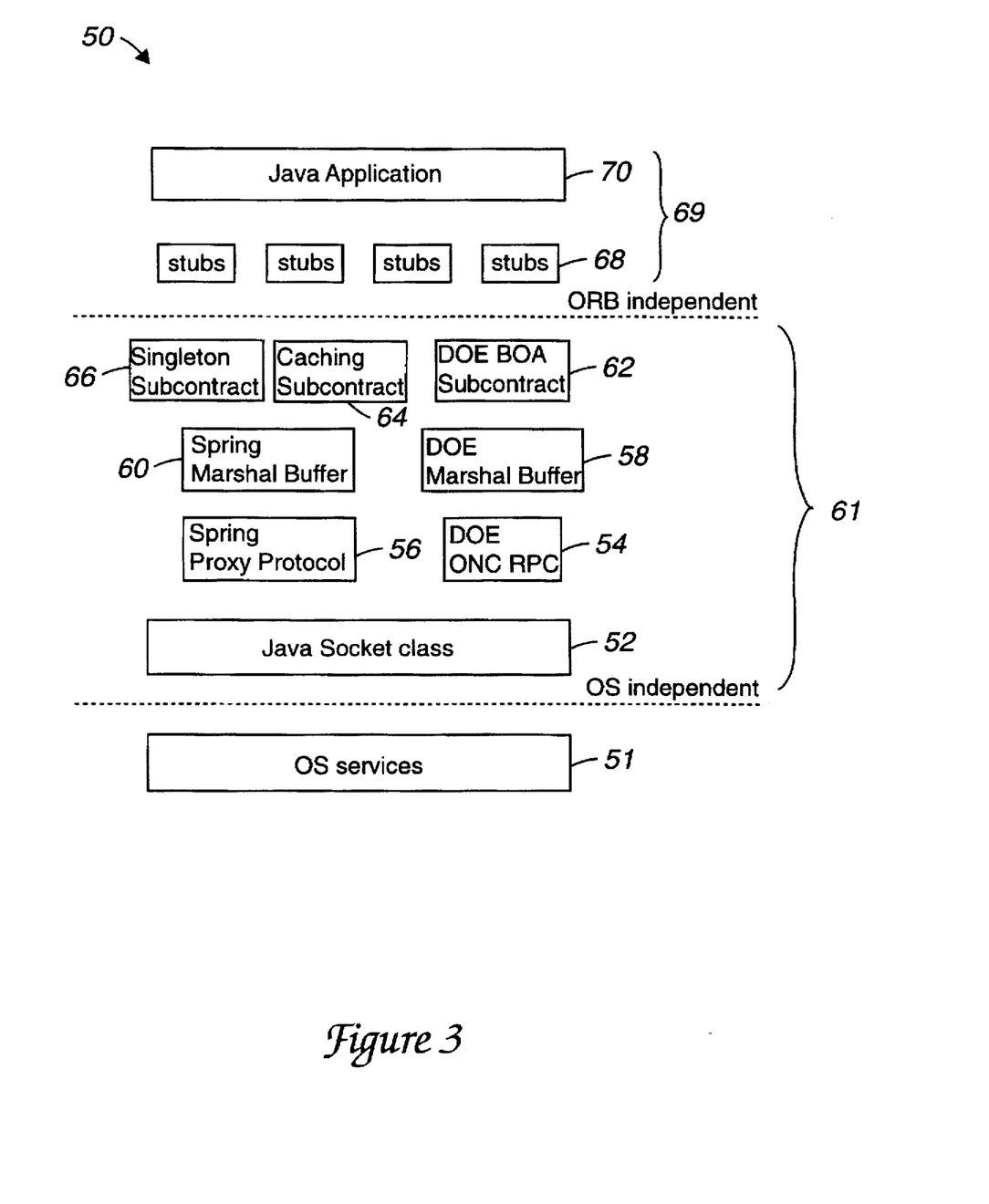
FIG. 3 illustrates a system showing Java ORB classes.
Figure 4:
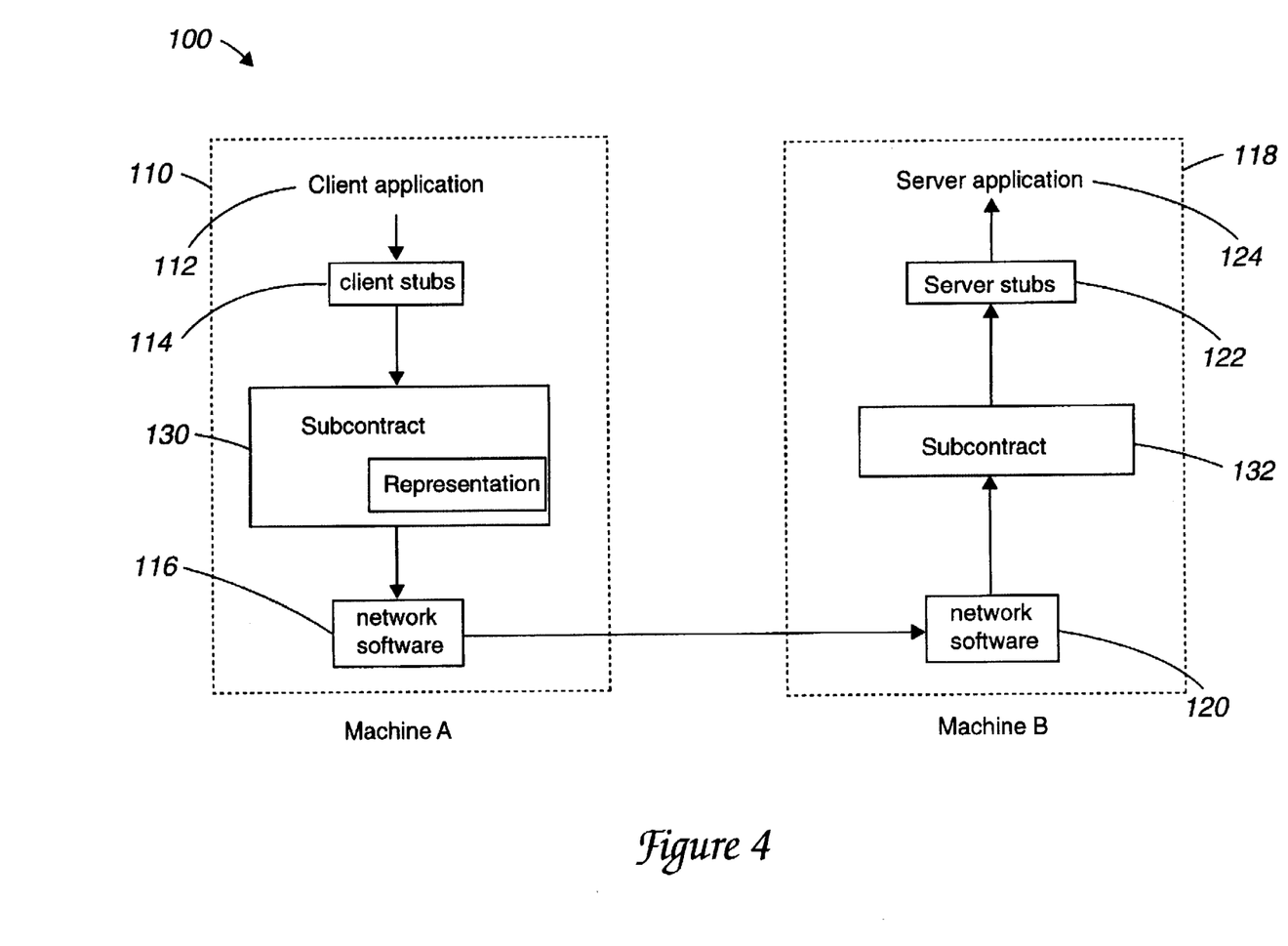
FIG. 4 illustrates the relationship between stub objects, ORB specific code/subcontract mechanisms, and server application objects in a single ORB system.

In the JAVA ORB implementation of the preferred embodiment one extra abstract interface was added so that a single set of stubs could communicate with multiple ORBs. An abstract MarshalBuffer interface was added and the creation of MarshalBuffers was moved from the stubs into the subcontracts, so that different ORBs could provide different sub-classes of MarshalBuffer which marshalled and unmarshalled data in the correct format for that ORB. FIG. 3 provides an illustration of the Java ORB classes. In FIG. 3, A Java Application 70 uses a set of stubs 68 to talk to a set of remote objects (not shown). These stubs and applications comprise an "ORB Independent" layer 69 which interface generically with the "OS Independent/ORB dependent" layer 61. An exemplary "OS Independent/ORB dependent" layer 61 comprises, for example, two different Spring subcontract mechanisms 66, 64 that use the same Marshal-Buffer 60 and the same Spring network protocol code mechanism 56 to talk to the remote object (not shown). An ORB dependent code mechanism 62 for use by Sun's DOE ORB is shown, which uses a DOE MarshalBuffer 58 which in turn uses the DOE network protocol code mechanism 54. In this example, both the Spring network protocol code mechanism 56 and the DOE network protocol code mechanism 54 use the Java network "Socket" code mechanism 52. (The Java "Socket" class provides access to TCP/IP and UDP functionality in a way that is broadly similar to the sockets interfaces provided in the Berkeley UNIX distributions.). This Java network "Socket" code mechanism 52 uses Operating System (OS) services 51 from whatever OS it is running on.

The MarshalBuffer Interface

In the preferred embodiment the interface between the stubs and the MarshalBuffer interface was defined so that the stubs not only marshal simple primitive types such as char and long, but are also given control over how structured IDL data types were marshalled. This meant providing generic MarshalBuffer methods for marshalling and unmarshalling array headers and union discriminators.

Putting the Pieces Together

Figure 5:
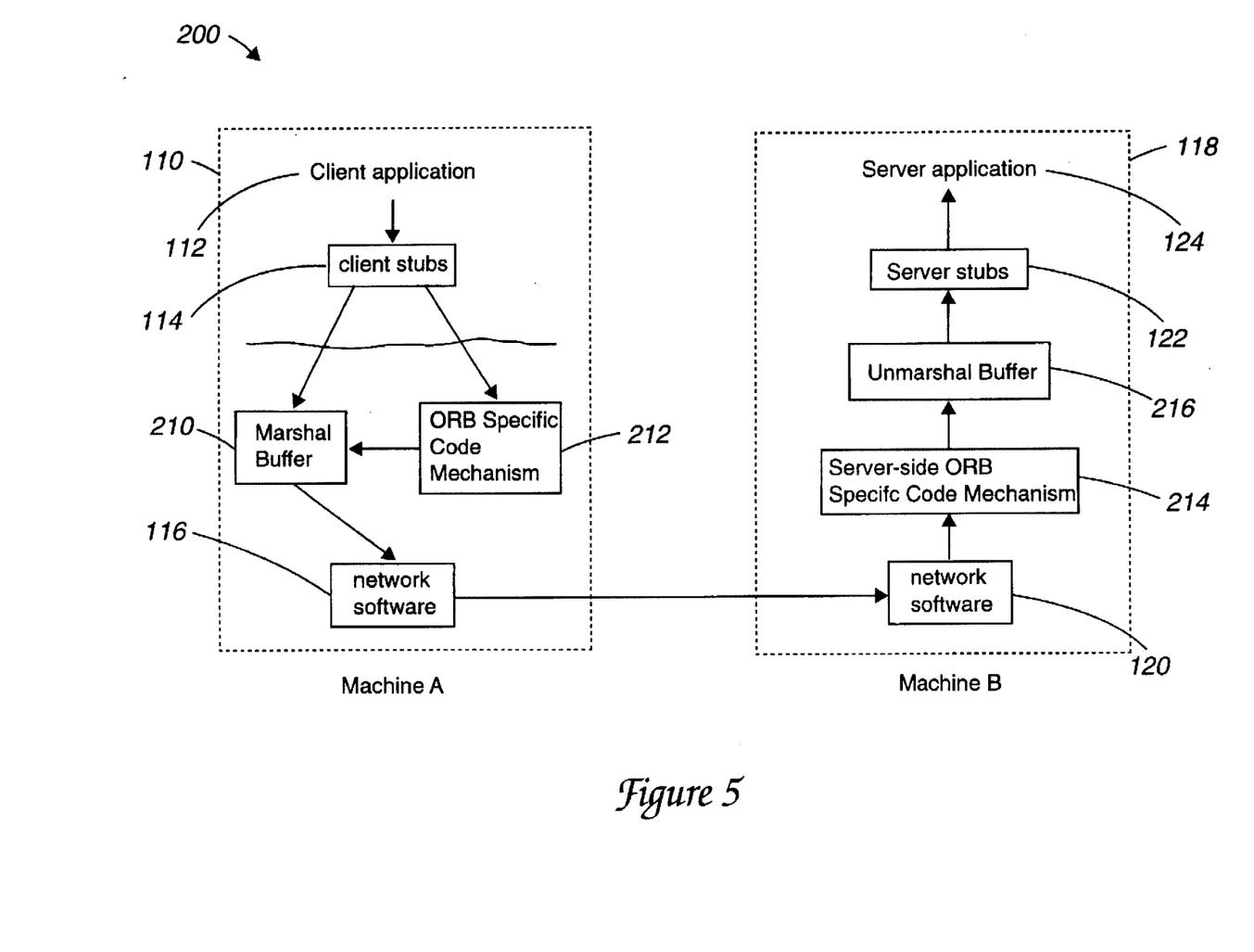
FIG. 5 illustrates remote object invocation using ORB specific code/subcontracts, ORB-specific MarshalBuffer mechanisms in a multi-ORB system.

In the context of the present invention different applications may call objects or send data to objects which have implementations that are associated with different ORBs but in this case using ORB-independent code/subcontract mechanisms to determine the target ORB, to find a MarshalBuffer that knows how to marshal the data for the target implementation and to communicate with the machine containing the target implementation. Referring now to FIG. 5, the client application 112 again issues the call on stub 112. In this instance however, the stub 112 sends the call to an ORB-specific code/subcontract mechanism 212 determined in the preferred embodiment by an indication in the objref. (An alternative embodiment would include some ORB-ID mechanism for identifying the ORB-specific code mechanism required by a specific object call, where this ORB-ID mechanism might be specified when the object implementation is created and used each time this object is called thereafter. Those skilled in the art will recognize that there are many ways to identify the ORB-specific code required by an Object reference.) This ORB-specific code/subcontract mechanism 212 determines what format is required by the target ORB and provides a MarshalBuffer Object 210 capable of doing the correct marshaling, notifying the client stub 114 of which MarshalBuffer Object 210 is to be used. The client stub 114, using this MarshalBuffer Object 210 marshals the data and sends it to the network software code mechanism/device 116 as before. On the server side 118 the target ORB-specific code mechanism 214 knows how to unmarshal the data and passes it to the Unmarshal Buffer 216 which in the case of a Java transmission may be a virtual machine to interpret the byte-code data for execution by the server machine.

In the preferred embodiment, for any IDL object reference of type FOO, we provide a Java stub class FOO that consists of a set of stub methods and pointer to a subcontract object that contains information identifying the server object. Each object of the stub class will point to a different subcontract object, and these subcontract objects may have different implementations, allowing them to talk to different ORBS. When the stub methods wish to make an object invocation they ask the subcontract to give them a suitable MarshalBuffer object and then use that MarshalBuffer to marshal the arguments and marshal the results. An exemplary MarshalBuffer is shown in FIG. 6. The MarshalBuffer interface shown in FIG. 6 represents a clean separation between the functionality of the ORB dependent code in marshaling and unmarshalling data. The stubs understand the particular set of arguments or results that are required for a particular IDL call. The stubs then call into the ORB dependent code mechanism that implements the MarshalBuffer interface in order to marshal (or unmarshal) each data item contained in the arguments or results. The ORB dependent code mechanism knows nothing about the IDL interface but simply marshals each data item in the correct format for that target ORB. Key concepts in the preferred embodiment are that (1) the MarshalBuffer interface such as shown in FIG. 6 is an interface which different ORBs can provide their own implementation for, and (2) the ORB dependent code provides the MarshalBuffer object to the stubs.

Figure 7:
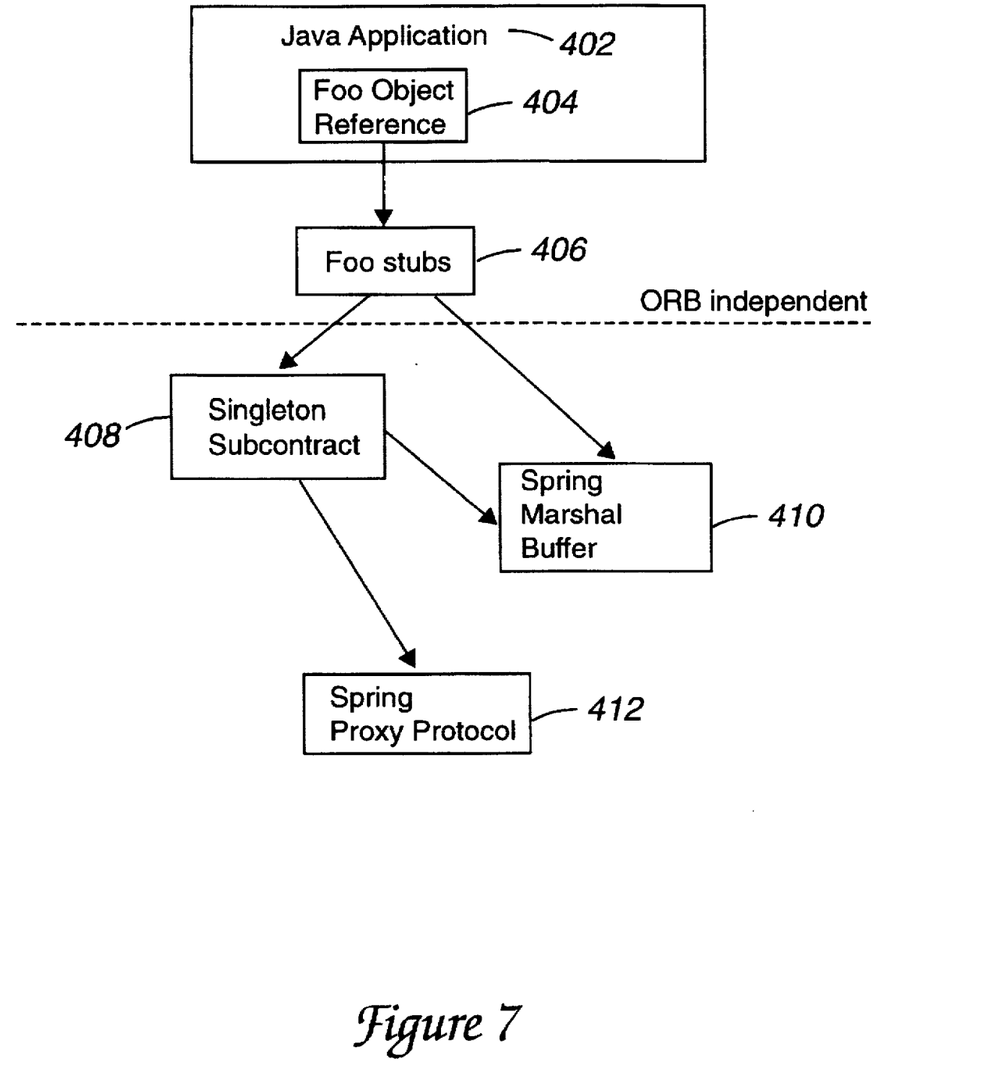
FIG. 7 illustrates a more specific remote object invocation using ORB specific code/subcontracts, ORB-specific MarshalBuffer mechanisms in a multi-ORB system.

So for example, referring now to FIG. 7 an object reference of IDL type FOO 404 that points at a Spring server (not illustrated) might use Spring's Singleton subcontract 408. When the stubs for FOO 406 come to make a call on one of the FOO methods they first ask the subcontract 408 to give them a MarshalBuffer. The Singleton subcontract 408 will return a Spring MarshalBuffer 410 that will obey the Spring on-the-wire data formats. The stubs 406 then marshal the method arguments into that marshal buffer 410. After the stubs 406 have marshalled all the arguments, they call into the Subcontract 408 to actually transmit the method invocation to the server. The Singleton subcontract 408 uses the Spring network protocol handlers 412 to transmit the request to the Spring server and get the results. The stubs 406 can then marshal the results from the MarshalBuffer 410 and return them to the client application 402.

In the preferred embodiment, a stub compiler contojava that generates complete Java client stubs for IDL interfaces is used.

In addition, a working Java ORB implementation that can communicate with both DOE and Spring servers is used. The code for talking to Spring includes two subcontracts (Caching and Singleton) and a Java implementation of Spring's proxy—proxy protocol. The code for talking to DOE includes a single subcontract (for the Basic Object Adapter (BOA)) and code for locating and activating DOE BOA objects. All of this ORB code is written in Java and is portable between different Java environments. It is believed that this ORB core could be easily extended with subcontracts that could talk to UNO or to ORBs implemented by other vendors.

While the invention has been described in terms of a preferred embodiment in a specific operating system environment, those skilled in the art will recognize that the invention can be practiced, with modification, in other and different operating systems within the spirit and scope of the appended claims.

What is claimed is:

1. A computer system having a processor, a memory, a display device, an input/output device, an operating system (OS), for processing program code mechanism invocations which are directed to one of a multiplicity of remote Object Request Brokers (ORBs), the computer system comprising:

an ORB independent layer of code mechanisms including program applications and related stubs; and an ORB dependent layer of code mechanisms, coupled to the ORB independent layer, the ORB dependent layer comprising program code mechanisms which are ORB-specific and which are configured to generate a marshal code mechanism to marshal data in an ORB required format and, program code mechanisms configured to use a specific network protocol code whereby a program application code mechanism from the ORB independent layer can invoke a call on a remote implementation program code mechanism and the ORB-specific program code mechanisms in the ORB dependent layer will determine an appropriate marshal code mechanism to marshal data in an ORB required format;

thereby providing a computer system capable of communicating with a multiplicity of ORBs wherein each ORB requires data to be in a specific format.

2. A computer system as defined in claim 1 wherein the ORB independent layer of code mechanisms including program applications and related stubs comprise object applications and related stubs.

3. A computer system as defined in claim 1 wherein the marshal code mechanism to marshal data in an ORB required format which is located in the ORB-dependent layer is a MarshalBuffer Object configured to execute operations to marshal data in an ORB specific format.

4. A computer system as defined in claim 1 wherein the program code mechanism configured to use a specific network protocol code communicates with a server computer comprising:

a receiving program code mechanism comprising ORB dependent code configured to receive an object invocation from a remote computer system; and an ORB independent server application whereby the receiving program code mechanism calls into the ORB independent server application, passing in a MarshalBuffer that allows the server application to unmarshal arguments and marshal results without having to know which ORB a call came from.

5. A multi-ORB marshaling system for use in a computer node which contains client applications and related stubs for communicating with remote computer nodes which contain object implementations, the multi-ORB marshaling system comprising:

an ORB-specific program code mechanism configured to receive an invocation of a target object implementation by an invoking client application, the invocation being received from a stub related to the invoking client application, wherein the invoking client application and the related stub have no knowledge of an ORB which must process the invocation, the ORB-specific program code mechanism configured to select one of a multiplicity of MarshalBuffer program code mechanisms; and a MarshalBuffer program code mechanism, coupled to said ORB-specific program code mechanism configured to receive an invocation of a target object implementation, said MarshalBuffer program code mechanism configured to marshal arguments and data into a specific format required by the ORB which must process the invocation.

6. A MarshalBuffer program code mechanism for use in a computer node which contains client applications and related stubs for communication with remote computer nodes which contain object implementation, the MarshalBuffer program code mechanism comprising:

program code mechanisms configured to format arguments and data related to an object implementation invocation made by a client application having a related stub, wherein said invocation and said client application and said related stub have no knowledge of an ORB which can process said invocation and wherein said invocation and said client application and said related stub have no knowledge of a data format required by said ORB which can process said invocation.

7. A method of operating a computer system having a processor, a memory, a display, an input/output mechanism, an operating system and at least one client application program, one or more stub programs related to the client application, the method performed by the computer comprising the steps of:

invoking a call on a program implementation code mechanism, the call invocation being made by a client application wherein the call includes a reference to the program implementation code mechanism;

using a stub program code mechanism which is related to the client application to receive the call invocation, wherein the stub program code mechanism has no knowledge of a format required for marshaling data provided by the client application in connection with the call invocation;

calling a first specific program code mechanism by the stub program code mechanism, requesting the first specific program code mechanism to provide a MarshalBuffer code mechanism that knows how to format data provided by the client application in connection with the call invocation;

marshaling the data provided by the client application in connection with the call invocation, the marshaling being done by the stub program code mechanism using the MarshalBuffer code mechanism; and sending the call invocation to a server containing the program implementation code mechanism which is the target of the call.

8. The method described in claim 7 comprising the additional step of unmarshalling results from the MarshalBuffer, the results supplied by the program implementation code mechanism which was called by the invocation.

9. The method described in claim 7 wherein the first specific program code mechanism called by the stub program code mechanism is an Object Request Broker (ORB) specific code mechanism.

10. The method described in claim 8 wherein the stub program code mechanism which calls the ORB specific code mechanism has no knowledge of the ORB which will process the call.

11. The method described in claim 7 wherein the Object Request Broker (ORB) is an Object Management Group (OMG) Common Object Request Broker (CORBA) compliant ORB.

12. A computer program product comprising a computer system usable storage medium having computer readable code embodied therein for causing a computer system to process program code mechanism invocations which are directed to one of a multiplicity of remote Object Request Brokers (ORBs), the computer program product comprising:

a first computer readable program code mechanism configured to comprise an ORB-independent layer of code mechanisms including client applications and related stub program code mechanisms; and a second computer readable program code mechanism configured to comprise an ORB dependent layer of code mechanisms, coupled to the ORB independent layer, the ORB dependent layer comprising program code mechanisms which are ORB-specific and which are configured to generate a marshal code mechanism to marshal data in an ORB required format and program code mechanisms configured to use a specific network protocol code whereby a program application code mechanism from the ORB independent layer can invoke a call on a remote implementation program code mechanism and the ORB-specific program code mechanisms in the ORB dependent layer will determine an appropriate marshal code mechanism to marshal data in an ORB required format, thereby providing a computer system capable of communicating with a multiplicity of ORBs wherein each ORB requires data to be in a specific format.

13. A computer program product as defined in claim 12 wherein the ORB independent layer of code mechanisms including program applications and related stubs comprise object applications and related stubs.

14. A computer program product as defined in claim 12 wherein the marshal code mechanism to marshal data in an ORB required format which is located in the ORB-dependent layer is a MarshalBuffer Object configured to execute operations to marshal data in an ORB specific format.

15. A computer program product as defined in claim 12 wherein the program code mechanism configured to use a specific network protocol code which is located in the ORB-dependent layer is configured to use a network protocol code mechanism selected from a group consisting of Spring network protocol code and DOE network protocol code.

16. A computer program product as defined in claim 12 wherein the marshal code mechanism to marshal data in an ORB required format which is located in the ORB-dependent layer is also configured to unmarshal results returned to it.

17. A method for use in a computer node which contains client applications and related stubs for communicating with remote computer nodes which contain object implementations wherein the computer implementations require invocation data to be in specific formats, the method, performed by the computer, comprising the steps of:

using an Object Request Broker (ORB)-specific program code mechanism configured to receive an invocation of a target object implementation by an invoking client application, the invocation being received from a stub related to the invoking client application, wherein the invoking client application and the related stub have no knowledge of an ORB which must process the invocation, the ORB-specific program code mechanism configured to select one of a multiplicity of MarshalBuffer program code mechanisms; and using a MarshalBuffer program code mechanism configured to marshal arguments and data into a specific format required by the ORB which must process the invocation.

18. A method for marshaling data into a specific format for use in a computer node which contains client applications and related stubs for communicating with remote computer nodes which contain object implementations, the method for marshaling data, performed by a computer, comprising the steps of:

providing marshal program code mechanisms associated with a plurality of Object Request Brokers (ORBs) which require distinct data formats, the marshal program code mechanisms being configured to format arguments and data related to an object implementation invocation made by a client application, wherein said invocation and said client application have no knowledge of an Object Request Broker (ORB) which can process said invocation and wherein said invocation and said client application have no knowledge of a data format required by said ORB which can process said invocation;

selecting a particular marshal program code mechanism from the marshal program code mechanisms based upon a particular invocation; and using said selected marshal program code mechanism to marshal and unmarshal said arguments and said data.

19. A computer system as defined in claim 1 wherein the ORB-dependent layer is also independent of the Operating System (OS) layer.

20. The method of claim 7 comprising the additional steps of:

receiving an object invocation from a remote computer system by a server-side ORB dependent code mechanism; and issuing a call into an ORB independent server application, the call made by the server-side ORB dependent code mechanism which passes in a MarshalBuffer that allows the server application to unmarshal arguments and marshal results without having to know which ORB a call came from.

21. A computer-implemented method of operating a computer system having a processor, a memory, an operating system, and a client application, the method comprising:

invoking a call on a target object, the call invocation being made by the client application wherein the call includes a reference to the target object, the target object being associated with a server application, the server application being associated with the computer system;

using a stub which is related to the client application to receive the call invocation, wherein the stub has no knowledge of a specific format required for marshaling data provided by the client application in connection with the call invocation, the specific format required for marshaling data being associated with the server application;

calling a specific code mechanism using the stub;

requesting a MarshalBuffer object from the specific code mechanism, the MarshalBuffer object being arranged to format the data provided by the client application into the specific format in connection with the call invocation;

marshaling the data provided by the client application in connection with the call invocation, the marshaling being done using the MarshalBuffer object, wherein marshaling the data formats the data in the specific format; and sending the call invocation to the server application containing the target object.

* * * * *